United States Patent [19]

Bolton et al.

[11] 4,420,402
[45] Dec. 13, 1983

[54] METHOD AND APPARATUS WITH COUCH PRESS FOR DEWATERING A SLURRY OF FINE PARTICLES

[75] Inventors: Joseph A. Bolton, Queensbury; Louis L. Dufresne, Glens Falls, both of N.Y.

[73] Assignee: Albany International Corp., Menands, N.Y.

[21] Appl. No.: 328,084

[22] Filed: Dec. 7, 1981

[51] Int. Cl.³ .............................................. B01D 37/00
[52] U.S. Cl. ........................................ 210/783; 210/401
[58] Field of Search ............... 210/783, 400, 401, 769, 210/771

[56] References Cited

U.S. PATENT DOCUMENTS 2,730,933   1/1956   Reynolds ............................ 210/771
3,870,632   3/1975   Erskine .............................. 210/769

Primary Examiner—Frank Sever
Attorney, Agent, or Firm—Kane, Dalsimer, Kane, Sullivan and Kurucz

[57] ABSTRACT

A method and apparatus for dewatering a slurry of fine particles including a dewatering table and a forming fabric passed across the table. Vacuum is applied to the table and the forming fabric. A first slurry of particles is introduced through a primary headbox to the forming fabric. A second slurry of finer particles is introduced through a secondary headbox to the forming fabric. The primary and secondary headboxes are positioned relative to each other and the table so that the first slurry is introduced to the forming fabric before the second slurry as the fabric moves across the table. Vacuum is applied to the first slurry to form a mat of first slurry particles upon which the second slurry of finer particles is deposited to be dewatered thereby minimizing the loss of fine particles through the forming fabric and maximizing the amount of retained dewatered particles. A couch press is positioned adjacent the discharge end of the dewatering table and communicates therewith to receive the forming fabric and slurries thereon for further dewatering of the retained particles.

18 Claims, 3 Drawing Figures

METHOD AND APPARATUS WITH COUCH PRESS FOR DEWATERING A SLURRY OF FINE PARTICLES

BACKGROUND OF THE INVENTION

There are many environments where separation of liquid/particles mixtures is desirable. A difficulty that has often been encountered in the separation process concerns the loss of many of the finer particles. This occurs during the separation process where the fine particles are often too small to be captured by the separation medium and pass with the separated medium. Reclamation of these particles is extremely difficult and often too impractical and costly.

An example of a pertinent environment is in connection with the processing of coal. Coal from the mines is ground and classified into several fractions. A common system would be to send a $1\frac{1}{2}$ inch$\times 0$ fraction into the plant and make an initial separation into two fractions $1\frac{1}{2}\times\frac{1}{4}$ inch and $\frac{1}{4}\times 0$. The $\frac{1}{4}\times 0$ is then separated into $\frac{1}{4}$ by 28 mesh and $28\times 0$. The $28\times 0$ particles are called coal fines. As part of the cleaning and sizing of coal, a preparation plant must contend with these coal fines, that is coal particles finer than a 28 mesh screen.

In the past, these coal fines were separated by dissolved air floatation cells and dewatered on disc filters. The disc filters will dewater the fines to approximately 24% moisture. In a relatively large preparation plant, up to 150 tons per hour of fines are produced.

There is a desired in the industry to reduce the moisture content of the fine fraction. Drying is one alternative, however, it is expensive and a long term pollution source. An alternative is mechanical dewatering. It appears that a dryness of 15% moisture is the general target, with some preparation plants striving for $12\frac{1}{2}$% because of customer demands.

Dewatering of material has been accomplished in various industries in a variety of different ways, for example, mechanical devices such as vacuum augmented dewatering tables have been used in the paper-making industry for dewatering pulp and similar types of slurries.

A recent concept that has been gaining acceptance involves the principle of double-sided dewatering at the couch. This involves a couch press as a felted lump breaker roll. In principal, it is an inverted press with a special felt that works according to the transversal flow principle. The felt is designed so that it can receive considerable amounts of water. This water is then removed from the felt with effective suction pipes before its re-entry into the press nip. The increased dewatering, obtained partially through pressure and partially through double-sided dewatering, gives sizable gains in dry content. Increased water removal is obtained from both the double-sided dewatering at the couch and through the added pressure of the couch nip.

Other developed principles are also of interest. For example, in U.S. Pat. No. 3,138,088, the concept of using a mat of coarse particles as a base upon which finer particles can be collected is contemplated.

It would certainly be advantageous if principles of the above type could be adapted for use in a system for facilitating the dewatering of material such as coal fines and to enhance the amount of reclaimed coal fines in such a process.

SUMMARY OF THE INVENTION

With the above background in mind, it is among the primary objectives of the present invention to provide an improved method and apparatus for dewatering coal fines or similar materials. It is contemplated that two headboxes can be used to feed coal or other particle slurries to a vacuum drainage table. For example, a coarse fraction of coal is provided in the first headbox to form a mat very quickly, since this coal dewaters very easily. Once a mat is formed, a second layer of very fine coal can be added through the secondary headbox to thereby greatly reduce the losses through the forming fabric. There is a significant increase in the overall retention of the coal fines by dewatering through a mat instead of the forming fabric.

It is an object of the present system to take advantage of a coal preparation plant's ability to fractionate a coal slurry into different fractions, for example with hydrocyclones, dissolved air floatation, chemical flocking agents, etc. By utilizing a multiple headbox drainage system, a drainage table is provided that has several advantages as a vacuum dewatering system. It provides a lower horsepower per ton vacuum requirement, better dryness, and overall retention.

The system is designed so that a vacuum table is provided with a forming fabric passing over the table in a manner which forms a horizontal surface. The table is connected to a conventional vacuum source to apply vacuum to the forming fabric passing thereover. The table includes an arrangement of vacuum boxes and dewatering blades to act upon the forming fabric and material contained thereon. A primary headbox is positioned at the beginning of the horizontal surface formed by the forming fabric in the direction of travel and the coarser particle fines, for example, coal fines, are distributed from the primary headbox onto the forming fabric. The vacuum dewatering table then quickly dewaters these coarse fines as they travel along the table to thereby form a mat on the forming fabric. A secondary headbox, which may be movable, is positioned intermediate the ends of the horizontal surface in position to discharge particle fines, for example coal fines, that are smaller than the particles forming the mat on the forming fabric. The finer particles are deposited onto the mat where they are dewatered with vacuum boxes. Depositing the smaller fines onto the mat results in a greater retention of the smaller fines and minimizes the loss of these fines through the forming fabric. The resultant mat of coarse and fine particles thus encounters further dewatering by a couch press. The mat can then be discharged from the vacuum table and couch press in the most desirable dewatered form achieving a substantial reduction in moisture content and retaining an optimum amount of dewatered coal fines.

By incorporating a couch press integrated with the vacuum dewatering table, a complete job of particle dewatering is accomplished on a single machine.

It is an objective to provide a combination dewatering table and couch press as an integrated single piece of equipment which results in a low capital equipment cost.

It is an objective to use the apparatus and method of the present system to dewater fine particles such as coal fines to a significant degree on the order of 10% to 15% moisture level.

It is a further objective to provide a vacuum table and couch press combination that requires minimum maintenance and operates inexpensively and efficiently to give consistent results.

Additionally, the system is also designed to incorporate other advantageous features. For example, the dewatering vacuum boxes can be interconnected with suitable water/air or air/water separators and with centrifugal exhausters so that the air and water mixture exiting from the vacuum table can be separated to provide for collection of the water for reuse in cleaning showers or recycle within the system.

Still a further objective is to provide a system which is useful in dewatering of coal fines and also other similar industries with common dewatering problems such as the dewatering of corn residuals from a gasahol process.

In summary, a method and apparatus is provided for dewatering a slurry of fine particles. A forming fabric is passed across a dewatering table and vacuum is applied to the table and the forming fabric passed thereover. A primary headbox is positioned for the introduction of a first slurry of particles to the forming fabric. A secondary headbox is positioned for depositing a second slurry of particles to the forming fabric with the particles in the second slurry being finer than the particles in the first slurry. The primary and secondary headboxes are positioned relative to each other and the table so that the first slurry is introduced to the forming fabric before the second slurry as the fabric moves across the table and vacuum is applied thereto to dewater the slurry so that a mat is formed of first slurry particles upon which the second slurry of fine particles is deposited to be dewatered. In this manner, the loss of fine particles through the forming fabric is minimized and the amount of retained dewatered particles is maximized. A couch press is positioned on the discharge end of the dewatering table and receives the forming fabric and slurries thereon for further dewatering of the retained particles.

With the above objectives among others in mind, reference is made to the attached drawings.

DETAILED DESCRIPTION

Figure 1:
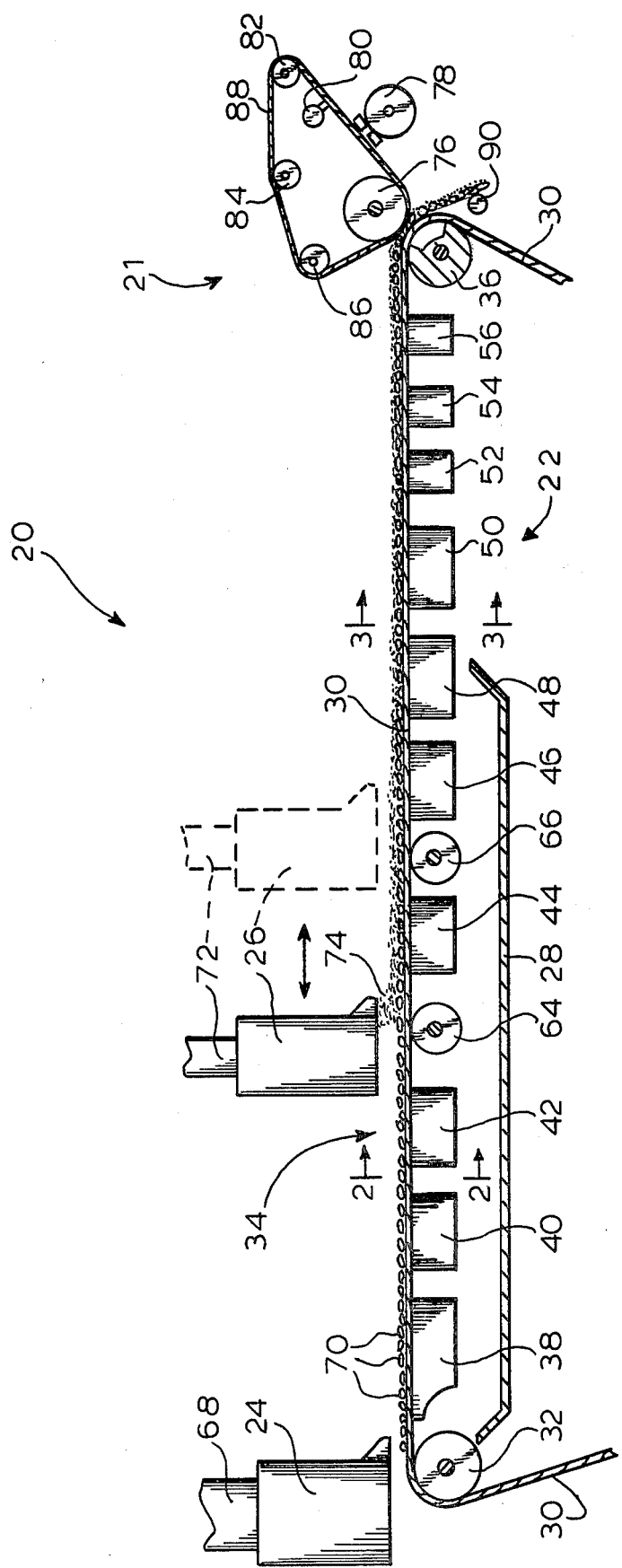
FIG. 1 is a schematic view of the apparatus of the invention with arrows showing the direction of travel and an alternate position of the movable secondary headbox shown in phantom.

Apparatus 20 is shown in FIG. 1 arranged for dewatering coal fines. The apparatus includes a dewatering table 22, a primary headbox 24, a secondary headbox 26, a collection pan 28 for separated water, and a couch press 21. The vacuum drainage table 22 and the couch press 21 are conventional types of Fourdrenier common to the papermaking industry and in the embodiment shown, they are structurally interconnected for use in the dewatering of coal fines. The working surface of dewatering table 22 is depicted in the schematic drawings and the remainder of the conventional structure is not shown. Similarly, the components of the couch press directly employed in the dewatering procedure are shown in schematic form in the drawing with the remainder of the conventional interrelated and interconnected structure not shown.

The forming fabric 30 of dewatering table 22 is an endless belt type of arrangement and enters the work area over a first guide roll 32 in a manner which directs the forming fabric into a horizontal direction to form a work surface 34 traveling in the direction shown by the arrow in FIG. 1, from left to right. The forming fabric extends a predetermined horizontal distance to form a work surface 34 and then exits the work area over a guide roll in the form of suction couch roll 36 from where it is directed down through the remainder of the dewatering table until it returns as an endless belt onto roll 32.

Beneath the work surface 34 formed by forming fabric 30 is a longitudinal arrangement of conventional dewatering equipment, for example that used in the papermaking industry. At the entry end is a bladed forming board 38 having, for example four blades and extending 24 inches wide. Adjacent to forming board 38 is a plurality of side by side bladed wet boxes 40, 42, 44, 46, 48, and 50. These wet boxes contain 23 blades and are approximately 30 inches wide. Adjacent to the last wet box in the direction of travel are three side by side flat boxes 52, 54 and 56. The last flat box is adjacent to the suction couch roll 36 at the end of the horizontal work surface 34. Each flat box has approximately a 10 inch wide cover. Vacuum is applied to the wet boxes and dry boxes to act in drawing air through the work surface portion of the forming fabric and therewith drawing water from the particles deposited on the work surface. In the depicted embodiment, the particles are coal fines. A conventional source of suction can be utilized for applying the vacuum such as a centrifugal exhauster, or alternatively, a positive displacement type vacuum pump, driven by a suitable drive motor and electrically controlled. As previously stated, a collector pan 28 is positioned beneath the wet end of the dewatering table for collecting the substantial portion of water initially removed from the particles on the work surface. Appropriate support rolls 64 and 66 are provided to support the central portion of the work surface area 34 and maintain it in substantially horizontal position.

The primary headbox 24 is positioned immediately above the entrance roll 32 at the initial point of work surface 34. The secondary headbox 26 is positioned intermediate the ends of the work surface 34 and is shiftable as shown by the arrow of FIG. 1 between a desired chosen arrangement of positions in the intermediate portion of the work surface. Both headboxes are also commonly available well known commercial products.

Figure 2:
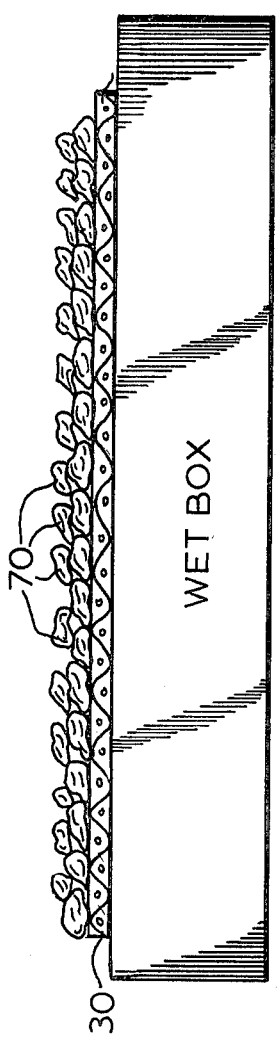
FIG. 2 is an enlarged fragmentary view of a portion of the apparatus and an initial point in the process.

A suitable introducing conduit 68 is connected to the primary headbox 24 and to a source of a first slurry of coarse coal fines. This slurry of coarse coal fines 70 is introduced through the primary headbox at the initial end of the work surface 34 onto the forming fabric 30. These particles are initially dewatered very quickly under the influence of vacuum on the dewatering table and the bladed forming board 38 and wet boxes 40 and 42. This dewatered mat of coarse particle 70 is shown in detail in FIG. 2 as it rests on the forming fabric 30.

Figure 3:
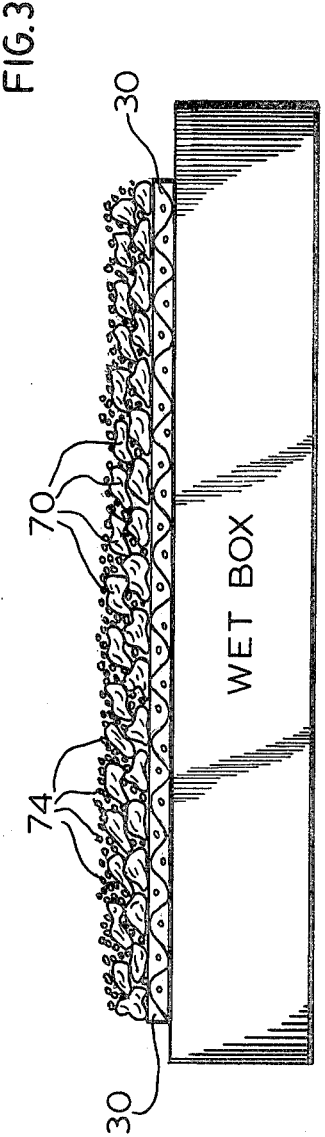
FIG. 3 is an enlarged fragmentary view showing a portion of the apparatus at a secondary point in the process.

The mat of particles on the forming fabric than travels beneath the secondary headbox 26. A suitable conduit 72 is connected to a source of a second slurry of coal fines 74 smaller in size than the coarse coal fines 70 and to the secondary headbox 26 so that a second slurry of fine particles 74 is deposited on the formed partially dewatered mat of coarse particles 70. The smaller particles 74 will rest on the mat of larger particles 70 as shown in detail in FIG. 3. This combination is dewatered through passage over the remaining wet boxes 44, 46, 48 and 50 and the flat boxes 52, 54 and 56 and by the vacuum applied thereto. As the water is removed from the mat of particles 70 and slurry of particles 74 a large number of the fine particles 74 will be retained on the larger particle 70 and will not pass through the forming fabric 30 and be lost. In this manner, a high percentage of fines are retained. The secondary headbox 26 is adjustable to facilitate deposition of the slurry of fine particles 74 onto the mat of coarser particles 70.

As the dewatered slurries reach the end of the horizontal work surface they encounter the couch press 21 where further dewatering occurs. The couch press includes the suction couch roll 36 which forms a nip with an opposing press roll 76. The combination of the forming fabric and the sheet of coarse particles 70 and fine particles 74 thereon pass through this nip between the suction couch roll 36 and the press roll 76 for further dewatering.

Adjacent to press roll 76 is a suction pipe 78 and on the opposite side of suction pipe 78 is a cleaning shower 80. A plurality of guide rolls 82, 84 and 86 are then arranged in sequence to form an endless path for a press felt 88. The endless press felt 88 travels in a counterclockwise direction about press roll 76, over suction pipe 78, past cleaning shower 80, and then over guide rolls 82, 84 and 86 until it again reaches press roll 76. Press roll 76 is operable to rotate counterclockwise as well and to move inward and outward with respect to the nip it is designed to form with suction couch roll 36.

A doctor blade assembly 90 is positioned just beyond the nip in the direction of travel to operate in removing the dewatered fine particles 74 and coarse particles 70 from forming fabric 30 which then passes to appropriate conventional cleaning procedures for reuse on the vacuum table.

Suction couch press 30 is also connected to a conventional source of suction in the form of a centrifugal exhauster as is suction pipe 78 in a conventional manner to apply the appropriate suction. The result is a double-sided dewatering of the combination forming fabric 30, fine particles 74 and coarse particles 70 as it enters the nip. The vacuum applied through suction couch roll 36 dewaters one side and the pressure applied by press roll 17 dewaters from the opposite side with water being collected on press felt 36. Thereafter, the water is removed from press felt 88 by suction pipe 78. Cleaning shower 80 cleans the press felt 88 for reuse in the nip.

After the dewatering process is completed in the nip, the particles are separated from the forming fabric by doctor blade assembly 90.

With the couch press fabric 88 on the top side of the mat and the suction couch roll 36 on the bottom side, double-sided dewatering is realized. Water is given a path to move upward into the void areas of the felt and downward through the forming fabric into the suction couch roll. The excess water pressed upward from the mat at the couch nip is captured in the void area of the press felt 88. This water is removed from the press felt 88 at the suction pipe 78.

In operation, using the depicted apparatus, coal fines can be dewatered in the following desirable manner. The primary headbox 24 and the secondary headbox 26 are used to feed different size coal slurries to the drainage table 22. In this manner, coal particles finer than a 28 mesh screen, commonly called 28×0 fines can be dewatered and retained. A coarser fraction of coal in the primary headbox is first deposited on the forming fabric 30. This coarse coal 70 dewaters very easily thus forming a mat very quickly. Once a mat is formed, a second layer of very fine coals 74 can be added through the secondary headbox 26, thus greatly reducing the losses through the forming fabric. In other words, the overall retention of the coal fines is significantly increased by dewatering through a mat instead of the forming fabric. The percentage retention of the coal fines increases as the mat travels from the wet end toward the dry end of the work surface 34. The present system takes advantage of a coal preparation plant's ability to fractionate coal slurried into different fractions. By utilizing a multiple headbox drainage system, a drainage table is provided that has several advantages including potentially lower horsepower per ton vacuum requirements, better dryness, and overall retention.

The dewatered combination of coarse coal 70 and fine coal 74 on the forming fabric is then introduced to the press nip between suction couch roll 36 and press roll 76. Double-sided dewatering is accomplished in the nip with the suction couch roll 36 dewatering on one side and the press felt 88 passing over press roll 76 dewatering on the opposite side. In this manner, the combination of fine and coarse coal fines can be reduced in moisture level to the range of 10 to 15 percent which is extremely desirable in commercial applications.

As it leaves the nip, the combination of coarse and fine coal particles is removed from forming fabric 30 by means of doctor blade assembly 90 in the desired dewatered condition.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

We claim:

1. An apparatus for dewatering a slurry of particles comprising: forming fabric; means for driving said forming fabric with said means being sized; primary headbox being sized for feeding a first slurry of particles at a predetermined rate onto the forming fabric; secondary headbox being sized for feeding a second slurry of particles at a predetermined rate onto the first slurry of particles deposited on the forming fabric; suction means being sized and positioned so as to provide a vacuum on forming fabric passing thereby; said forming fabric being of sufficient porosity and said suction means providing sufficient vacuum so as to allow dewatering of the first and second slurry of particles on the forming fabric by the suction means; said means for driving said forming fabric drives at a rate sufficient to provide a mat of essentially only two discrete layers on the forming fabric; and a couch press receiving said mat for further dewatering thereof.

2. The invention in accordance with claim 1 wherein the particles being dewatered are coal particles.

3. The invention in accordance with claim 2 wherein the coal particles in the second slurry are finer than 28 mesh.

4. The invention in accordance with claim 1 which further includes a dewatering table supporting the forming fabric thereon and wherein the primary headbox is positioned at the end of the dewatering table first contacted by the forming fabric in the direction of travel across the table and the secondary headbox is located intermediate the ends of the dewatering table and is movable to facilitate deposition of the second slurry upon the mat of first slurry particles on the forming fabric.

5. The invention in accordance with claim 1 which further includes a dewatering table supporting the forming fabric thereon and wherein the dewatering table includes spaced guide rolls over which the forming fabric passes in order to form a horizontal receiving surface of forming fabric between the rolls for deposition of the slurries of particles thereon, collection means beneath the table for accumulation of the water removed from the slurry, a bladed forming board beneath the surface of forming fabric adjacent to the primary headbox and, a plurality of bladed wet boxes side by side beneath the horizontal surface formed by the forming fabric and the first wet box in the direction of travel of the forming fabric being adjacent to the bladed forming board, a plurality of flat boxes in side by side position beneath the horizontal surface formed by the forming fabric and with the first flat box in the direction of travel of the forming fabric being adjacent to the last of the bladed wet boxes, the last flat box in the direction of travel being adjacent to the end of the horizontal surface of forming fabric in the direction of travel.

6. The invention in accordance with claim 1 which further includes a dewatering table supporting the forming fabric thereon and wherein the dewatering table includes at least one flat box, an air/water separator connected to the at least one flat box, a centrifugal exhauster connected to the separator for applying vacuum to the dewatering table and the separator and discharging separated air, means for collecting the water accumulated in the separator, drive means for the exhauster, and control means for operating the drive means and exhauster.

7. The invention in accordance with claim 6 wherein the exhauster is connected to a hood overlying a portion of the forming fabric for allowing a predetermined portion of the dewatering table to supply separated air to the forming fabric thereon and facilitate the dewatering process.

8. The invention in accordance with claim 1 which further includes a dewatering table supporting the forming fabric thereon and wherein the dewatering table includes at least one wet box beneath the forming fabric through which to accumulate a mixture of air and water during dewatering of the particles, an air/water separator connected to the at least one wet box to separate the air and water mixture accumulated therein, a centrifugal exhauster connected to the separator to supply vacuum to the dewatering table and the separator and to collect and dispose of the air segregated in the separator, drive means for the separator, means for collecting water accumulated in the separator, and control means for operating the exhauster, the separator and the remainder of the dewatering table.

9. The invention in accordance with claim 1 which includes a dewatering table supporting the forming fabric thereon and having an end at which the particles are discharged; the couch press is positioned at the discharge end adjacent to the last flat box in the direction of travel and said press includes a suction couch roll over which the forming fabric passes as it discharges from the table, a doctor blade positioned adjacent to the suction couch roll on the opposite side thereof from the last flax box, a press roll positioned adjacent to the suction couch roll so as to form a nip therebetween, a plurality of guide rolls spaced from one another and from the press roll, a press felt traveling about the press roll and guide rolls and passing through the nip formed between the suction couch roll and the press roll, a suction pipe adjacent to the press roll, a cleaning shower adjacent to the suction pipe so that as the press felt travels it sequentially passes over the press roll, the suction pipe, and the cleaning shower, whereupon the forming fabric and slurries discharged from the table enter the nip formed between the suction couch roll and the press roll and suction applied to the couch roll will further dewater the slurries and further water will be accumulated on the press felt due to the pressure in the nip, the slurries thereafter being removed from the forming fabric by the doctor blade and the press felt being thereafter dewatered by the suction pipe and cleaned by the cleaning shower, means for rotating the suction couch roll and press roll relative to one another, and vacuum means for applying suction to the suction couch roll and the suction pipe.

10. A method for dewatering a slurry of particles comprising: providing a primary headbox, secondary headbox, suction means, forming fabric of preselected porosity, means for driving the forming fabric, and a couch press; feeding a first slurry of particles at a first rate from the primary headbox onto the forming fabric; feeding a second slurry of particles at a second rate from a secondary headbox onto the first slurry of particles; creating a sufficient vacuum on the first and second slurry of particles through the forming fabric by the suction means to cause dewatering of the first and second slurries thereon; driving said forming fabric at a fourth rate of speed by the driving means; said first, second, third and fourth rates of speed being sufficient so as to provide a mat of essentially only two discrete layers; and directing said mat to the couch press for further dewatering thereof.

11. The invention in accordance with claim 10 which includes the steps of providing coal particles to be dewatered.

12. The invention in accordance with claim 11 wherein the coal particles in the second slurry are finer than 28 mesh.

13. The invention in accordance with claim 10 which includes the steps of providing a dewatering table supporting the forming fabric thereon and a secondary headbox which is movable to facilitate deposition of the second slurry upon the mat of first slurry particles on the forming fabric; positioning the primary headbox at the end of the dewatering table first contacted by the forming fabric in the direction of travel across the table; and positioning the secondary headbox intermediate the ends of the dewatering table.

14. The invention in accordance with claim 10 which includes the steps of providing a dewatering table for supporting the forming fabric thereon which includes spaced guide rolls over which the forming fabric passes in order to form a horizontal receiving surface of forming fabric between the rolls for deposition of the slurries of particles thereon, collection means beneath the table for accumulation of the water removed from the slurry, a bladed forming board beneath the surface of forming fabric adjacent to the primary headbox and, a plurality of bladed wet boxes side by side beneath the horizontal surface formed by the forming fabric and the first wet box in the direction of travel of the forming fabric being adjacent to the bladed forming board, a plurality of flat boxes in side by side position beneath the horizontal surface formed by the forming fabric and with the first flat box in the direction of travel of the forming fabric being adjacent to the last of the bladed wet boxes, the last flat box in the direction of travel being adjacent to the end of the horizontal surface of forming fabric in the direction of travel.

15. The invention in accordance with claim 10 which includes the steps of providing a dewatering table for supporting the forming fabric thereon which includes at least one flat box, an air/water separator connected to at least one flat box, a centrifugal exhauster connected to the separator for applying vacuum to the dewatering table and the separator and discharging separated air, means for collecting the water accumulated in the separator, drive means for the exhauster, and control means for operating the drive means and exhauster.

16. The invention in accordance with claim 15 which includes the steps of connecting the exhauster to a hood overlying a portion of the forming fabric for allowing a predetermined portion of the dewatering table to supply separated air to the forming fabric thereon and thereby facilitate the dewatering process.

17. The invention in accordance with claim 10 which includes the steps of providing a dewatering table for supporting the forming fabric thereon which includes at least one wet box beneath the forming fabric through which to accumulate a mixture of air and water during dewatering of the particles, an air/water separator connected to the at least one wet box to separate the air and water mixture accumulated therein, a centrifugal exhauster connected to the separator to supply vacuum to the dewatering table and the separator and to collect and dispose of the air segregated in the separator, drive means for the separator, means for collecting water accumulated in the separator, and control means for operating the exhauster, the separator and the remainder of the dewatering table.

18. The invention in accordance with claim 10 which includes the steps of providing a dewatering table supporting the forming fabric thereon and having an end at which the particles are discharged, and positioning the couch press at the discharge end adjacent to the last flat box in the direction of travel and said press includes a suction couch roll over which the forming fabric passes as it discharges from the table, a doctor blade positioned adjacent to the suction couch roll on the opposite side thereof from the last flat box, a press roll positioned adjacent to the suction couch roll so as to form a nip therebetween, a plurality of guide rolls spaced from one another and from the press roll, a press felt traveling about the press roll and guide rolls and passing through the nip formed between the suction couch roll and the press roll, a suction pipe adjacent to the press roll, a cleaning shower adjacent to the suction pipe so that as the press felt travels it sequentially passes over the press roll, the suction pipe, and the cleaning shower, whereupon the forming fabric and slurries discharged from the table enter the nip formed between the suction couch roll and the press roll and suction applied to the couch roll will further dewater the slurries and further water will be accumulated on the press felt due to the pressure in the nip, the slurries thereafter being removed from the forming fabric by the doctor blade and the press felt being thereafter dewatered by the suction pipe and cleaned by the cleaning shower, means for rotating the suction couch roll and press roll relative to one another, and vacuum means for applying suction to the suction couch roll and the suction pipe.

* * * * *

UNITED STATES PATENT AND TRADEMARK OFFICE
CERTIFICATE OF CORRECTION

PATENT NO. : 4,420,402

DATED : December 13, 1983

INVENTOR(S) : Joseph A. Bolton, et al

It is certified that error appears in the above-identified patent and that said Letters Patent is hereby corrected as shown below:

The term of this patent subsequent to December 6, 2000, has been disclaimed.

Signed and Sealed this

Sixth Day of March 1984

[SEAL]

Attest:

GERALD J. MOSSINGHOFF

Attesting Officer

Commissioner of Patents and Trademarks